United States Patent [19]

Davies et al.

[11] Patent Number: 5,650,876

[45] Date of Patent: Jul. 22, 1997

[54] LENS SYSTEM WITH INTERMEDIATE OPTICAL TRANSMISSION MICROLENS SCREEN

[75] Inventors: Neil Davies, Nr Goole; Malcolm McCormick, Sheffield, both of United Kingdom

[73] Assignee: De Montfort University, Leicester, England

[21] Appl. No.: 513,774

[22] PCT Filed: Mar. 25, 1994

[86] PCT No.: PCT/GB94/00637

§ 371 Date: Dec. 7, 1995

§ 102(e) Date: Dec. 7, 1995

[87] PCT Pub. No.: WO94/22040

PCT Pub. Date: Sep. 29, 1994

[30] Foreign Application Priority Data

Mar. 25, 1993 [GB] United Kingdom .................. 9306250
Mar. 25, 1993 [GB] United Kingdom .................. 9306252

[51] Int. Cl.⁶ .................................................. G02B 27/10
[52] U.S. Cl. ............................ 359/622; 359/621; 359/626
[58] Field of Search .............................. 359/619, 622, 359/621, 623, 624, 626, 628

[56] References Cited

U.S. PATENT DOCUMENTS

| | | | |
|---|---|---|---|
| 3,657,981 | 4/1972 | Benton | 354/112 |
| 5,059,008 | 10/1991 | Flood | 359/196 |
| 5,291,334 | 3/1994 | Wirth | 359/622 |
| 5,351,151 | 9/1994 | Levy | 359/240 |
| 5,392,140 | 2/1995 | Ezra | 359/41 |
| 5,420,718 | 5/1995 | Davies | 359/448 |
| 5,465,175 | 11/1995 | Woodgate | 359/463 |
| 5,479,026 | 12/1995 | Schumtz | 250/568 |
| 5,499,138 | 3/1996 | Iba | 359/569 |
| 5,550,656 | 8/1996 | Sprague | 359/40 |

FOREIGN PATENT DOCUMENTS

| | | |
|---|---|---|
| 86308836 | 5/1987 | European Pat. Off. . |
| WO93/20473 | 10/1993 | WIPO . |

*Primary Examiner*—Georgia Y. Epps
*Assistant Examiner*—Ricky Mack
*Attorney, Agent, or Firm*—Wallenstein & Wagner, Ltd.

[57] ABSTRACT

A lens system comprising an input lens array (11), an optical transmission microlens screen (12), and an output lens array (13), in which the lenses (11a) of the input array (11) correspond along an optical axis with corresponding lenses (13a) of the output array (13).

9 Claims, 2 Drawing Sheets

LENS SYSTEM WITH INTERMEDIATE OPTICAL TRANSMISSION MICROLENS SCREEN

This invention relates to lens systems.

For 3-D integral imaging, in order to capture parallax information, a large aperture objective is called for. Such, however, is difficult to implement, especially if it is to be well corrected, for example for photographic use.

The present invention provides lens systems that do not require a large aperture monolithic objective.

The invention comprises a lens system comprising an input lens array, an optical transmission microlens screen and an output lens array, in which the lenses of the input array correspond to the lenses of the output array, and the input array lenses have focal lengths greater than those of the output array lenses.

The larger aperture of a monolithic objective is in this way synthesised from a plurality of smaller lenses.

The input and output lens arrays may be equidistant from the microlens screen.

The microlens screen may comprise an auto-collimating screen. The apertures of the corresponding lenses of the input and output lens array may be equal. The system may have a main axis, and each lens of the output lens array may have an output lens principal axis, and each lens of the input lens array have an input lens principal axis and the principal axis of each lens of the output lens array is displaced from the principal axis of the corresponding lens in the input lens array towards the said main axis by an amount which is proportional to the distance of the said corresponding lenses of the input and output lens arrays from the main axis of the system.

An optical instrument including such a lens system may define an image region between a back focal distance (from the output array) for a near object point ($BFD_n$) and a back focal distance for an object plane at infinity ($BFD_\infty$), in which:

the axial displacement d of a lens of the output array distant D from the main axis of the system is given by $$d = \frac{(D+X)}{(BFD_n+U)} \cdot U - \frac{DU}{V_1}$$

Having chosen this point of superposition for the rear point in the image, the distance $BFD_\infty$ to the point of superposition for a point at infinity is given by $$BFD_\infty = \frac{(D-d)}{d} f_1$$

where $f_1$ is the focal length of the input lenses, and the focal length $f_2$ of the lenses of the output lens array is given by $$\frac{1}{f_2} = \frac{1}{BFD_n} + \frac{1}{V}$$

where V is the array to screen distance.

In another embodiment, the microlens screen may comprise a double integral microlens array comprising arrays of different pitch producing a long integral focusing effect, and the system may then be so arranged that the microlens array forms a reduced image of the apertures of the input lens array on to the equally reduced apertures of the output lens array whereby to produce a scaled aerial pseudoscopic image.

The lenses of the arrays may be square, hexagonal or circular.

Embodiments of lens systems and optical instruments including them will now be described with reference to the accompanying drawings, in which.

Figure 6:
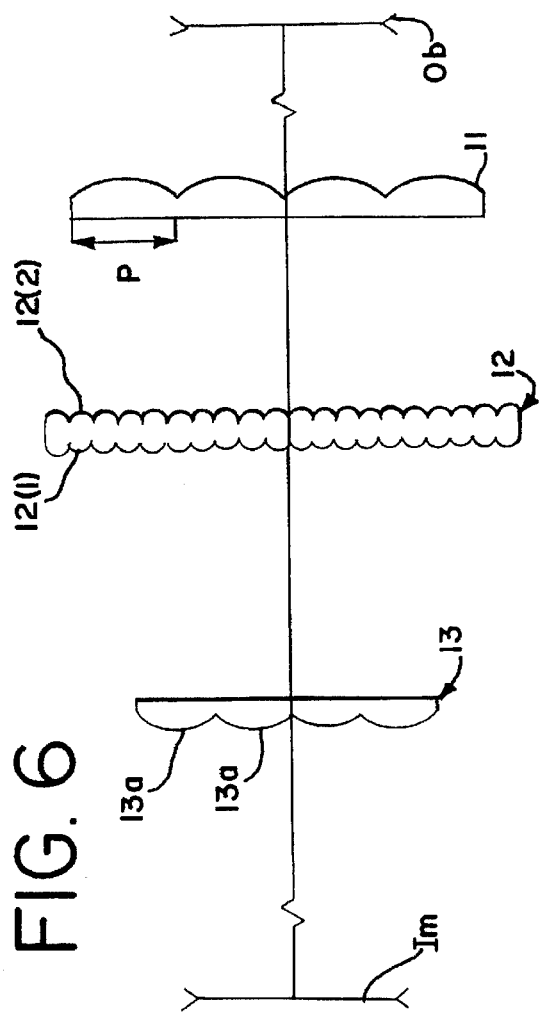
FIG. 6 is a diagrammatic axial section through another embodiment.
Figure 7:
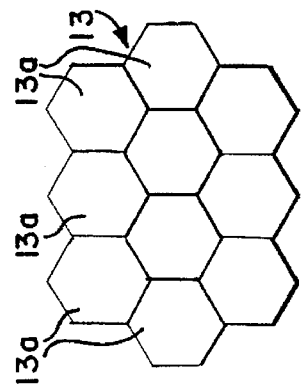

and FIG. 7 is a face-on view of the input lens array of the embodiment of FIG. 6.

The drawings illustrate lens systems comprising an input lens array 11, an optical transmission microlens screen 12 and an output lens array 13, in which the lenses 11a of the input array 11 correspond to the lenses 13a of the output array 13.

In each embodiment, the input and output lens arrays 11,13 are equidistant from the microlens screen 12 and the input array lenses 11a have focal lengths greater than those of the output array lenses 13a.

Figure 1:
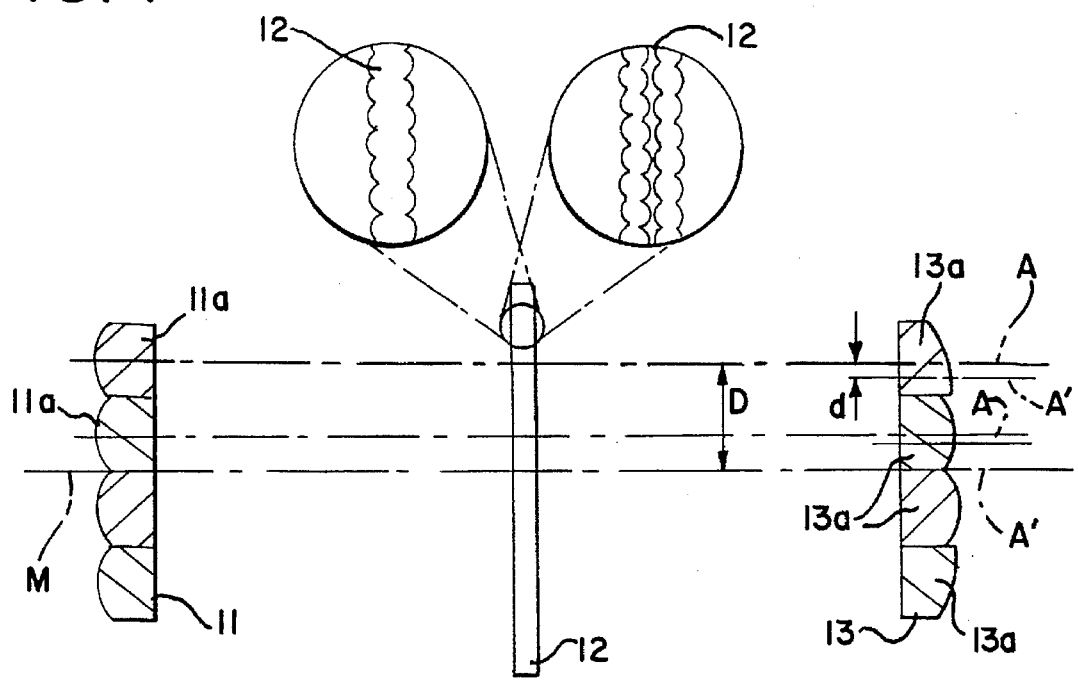
FIG. 1 is a diagrammatic axial section through one embodiment.

The microlens screen 12 of the embodiments illustrated in FIGS. 1 to 5 comprises an auto-collimating screen or double integral microlens array, which is to say an afocal arrangement in which the microlenses on each side are aligned, as seen in the enlarged details in FIG. 1. The left-hand detail shows, enlarged, one form of double integral screen in which convex lens surfaces are formed on opposite faces of a single plate. The right-hand detail shows two adjacent double integral arrays carefully aligned—this gives reduced vignetting and aberration.

The apertures of the corresponding lenses 11a,13a of the input and output arrays 11,13 are equal and the apertures of the input lenses 11a are projected on to the apertures of the output lenses 13a. The focusing effect is achieved by making the output lenses 13a deflect the incident rays at angles determined by a displacement of the axis of each lens 13a. Each lens 13a of the output array 13 has a principal axis $A^1$ which is displaced from the axis A of the corresponding lens 11a in the input lens array 11 towards the main axis M of the system by an amount d which is proportional to the distance D of the said corresponding lenses 11a, 13a from the main axis M of the System.

Figure 2:
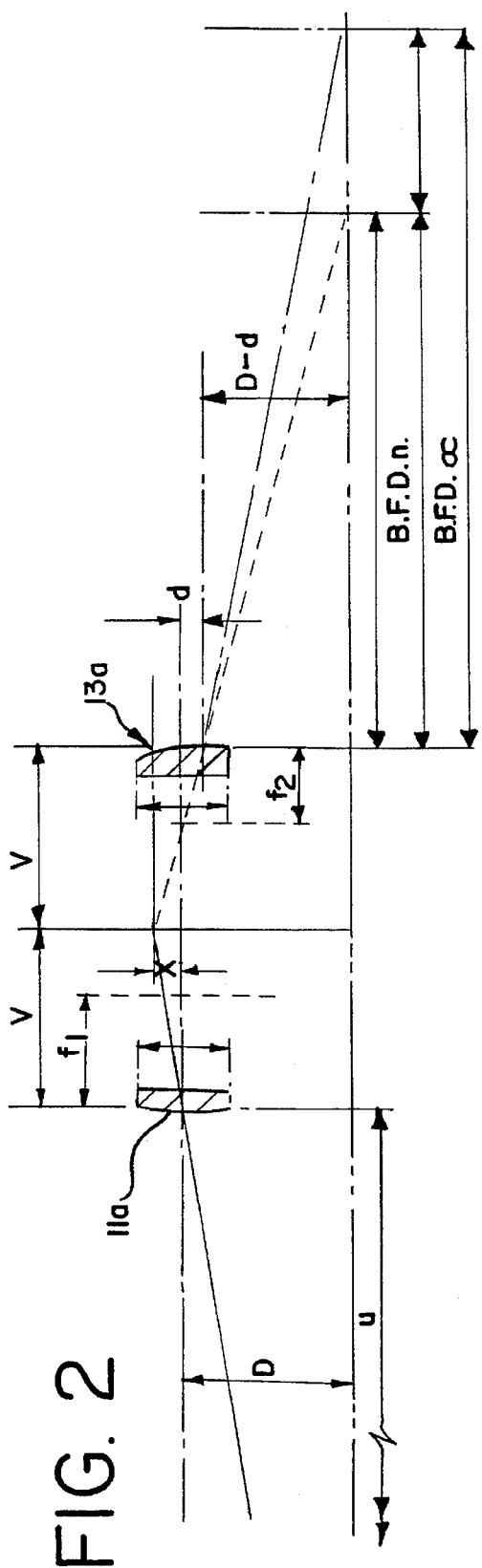
FIG. 2 is a ray diagram for the system of FIG. 1.

As seen in FIGS. 2, an optical instrument including such a lens system defines an image region between a back focal distance (from the output array 13) for a near object point ($BFD_n$) and a back focal distance for an object plane at infinity ($BFD_\infty$). The necessary displacement d of the output lens 13a under consideration in FIG. 2 is given by the relation $$d = \frac{(D+X)}{(BFD_n+U)} \cdot U - \frac{DU}{V}$$

where X is the displacement of the image point from U from the axis of the input lens in question. Where U is the distance from the input lens array to the object and V is the distance of the input lens array 11 from the microlens screen 12 (which is the same as the distance of the output lens array 13 from the screen 12). The focal length $f_2$ of the lenses 13a of the output lens array is given by $$\frac{1}{f_2} = \frac{1}{BFD_\infty} - 1$$

As seen in FIG. 1 the image fields produced by the various pairs of corresponding input and output lenses 11a, 13a are superimposed as a conjugate image at the back focal distance $BFD_n$ corresponding to the object position to produce the required integration of the image fields.

The final integrated image is therefore formed of superimposed image fields projected by the output lenses 13a.

Typical focal lengths of the input lenses 11a are 80 mm. The array to screen distance V can be 85 mm and the focal lengths of the output lenses 13a are typically 54 mm.

Figure 3:
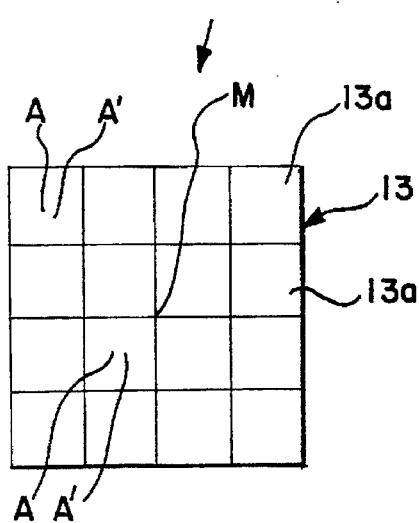
FIG. 3 is a face-on view of the output lens array of the system of FIG. 1.
Figure 4:
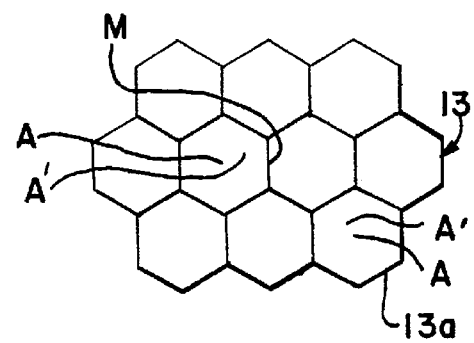
FIG. 4 is a face-on view like FIG. 3 of another embodiment of output lens array.
Figure 5:
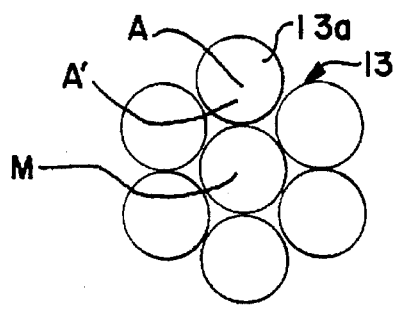
FIG. 5 is a view like FIG. 4 of yet another embodiment of output lens array.

FIGS. 3, 4 and 5 illustrate square, hexagonal and circular lenses 13a and indicate the displacement d of the axes $A^1$ of the output lenses 13a from the axes A of the corresponding input lenses 11a. The corresponding input lens array would be similar in face-on appearance but would have their principal axes central.

FIGS. 6 and 7 illustrate another embodiment of lens system—an integral transmission reduction lens system—in which the microlens screen 12 comprises arrays 12(1),12(2) of different pitch—an integral super lens or ISL—producing a long integral focussing effect. The system is so arranged that the microlens array 12 forms a reduced image of the apertures of the input lens array 11 on to the equally reduced apertures of the output lens array 13 whereby to produce a scaled aerial pseudoscopic image.

The focal lengths of the lenses in the ISL 12 of FIG. 6 are quite small—a 120 micron diameter lens has a focal length of about 360 microns. The effect of the mis-matched pitches is to produce an integral focussing effect which can be extremely long—typically 250 mm.

The output lens array 13 is made up of a closely packed array of hexagonal (see FIG. 7) plano-convex lenses 13a, as is the input lens array 11. The lenses 11a have a greater focal length that the lenses 13a, typically focal lengths being 80 and 54.25 mm respectively. By suitable selection of the ISL 12 focal length (integral)—for example 253.54 mm—the lens system can comprise an integral transmission reduction lens system of, for example, 168.54 mm focal length.

The resultant reduced image is a scaled aerial image which is reversed in the Z direction, i.e. is pseudoscopic.

The image plane distance DIm from the output lens array 13 is 168.54 mm for an object Ob infinitely distant from the input lens array 11, and 149.95 mm for an object distant 1360 mm. This is different from a normal monolithic lens, as can be seen by comparing a transmission reduction lens of this design with a monolithic lens which gives equal magnification to an object at 1360 mm distance.

An integral transmission reduction lens system as illustrated in FIGS. 6 and 7 gives a final magnification for an object at 1360 mm of −9.09X. An equivalent monolithic lens giving the same magnification will have a back focal distance of 149.6 mm and a focal length of 133.3 mm. So the integral transmission reduction lens system has an image depth of 18.59 mm whereas the monolithic lens has an image depth of 16.3 mm.

The resolution of the composite lens system is greater than the resolution of each segment of it.

We claim:

1. A lens system comprising an input lens array, an optical transmission microlens screen and an output lens array, in which the lenses of the input array correspond along an optical axis with corresponding lenses of the output array, the microlens screen is interposed between the input lens array and the output lens array, the input array lenses have focal lengths greater than those of the output array lenses, the system having a main axis, each lens of the output lens array having an output lens principal axis and each lens of the input lens array having an input lens principal axis, the principal axis of each lens of the output lens array being displaced from the principal axis of the corresponding lens of the input lens array towards said main axis by an amount which is proportional to the distance of the said corresponding lenses of the input and output arrays from the said main axis.

2. An lens system according to claim 1, in which the input and output lens arrays are equidistant from the microlens screen.

3. A lens system according to claim 1 or claim 2, in which the microlens screen comprises an autocollimating screen.

4. A lens system according to any one of claims 1 to 2 which the apertures of the corresponding lenses of the input and output lens arrays are equal.

5. A lens system according to claims 1 or 2, in which the microlens screen comprises a double integral microlens array comprising arrays of different pitch producing a long integral focusing effect and the system is so arranged that the microlens array forms a reduced image of the apertures of the output lens array on to the equally reduced apertures of the output lens array whereby to produce a scaled aerial pseudoscopic image.

6. An optical instrument including a lens system according to claim 2, defining an image region between a back focal distance (from the output array) for a selected near object point ($BFD_n$) and a back focal distance for an object plane at infinity ($BFD_\infty$), in which:

the axial displacement of a lens of the output array distant D from the main axis of the system is given by $$d = \frac{(D+X)}{BFD_n + U} \cdot U - \frac{DU}{V}$$

where $f_1$ is the focal length of the input lenses and X is the displacement of the image point of the object at distance U from the axis of $L_1$; and the focal length $f_2$ of the lenses of the output lens array is given by $$\frac{1}{f_2} = \frac{1}{BDF_n} + \frac{1}{V}$$

where V is the array to screen distance.

7. A lens system or instrument according to any one of claims 1, 2 or 6, in which the lenses of the arrays is square.

8. A lens system or instrument according to any one of claims 1, 2 or 6, in which the lenses of the arrays are hexagonal.

9. A lens system or instrument according to any one of claims 1, 2 or 6, in which the lenses of the arrays are circular.

* * * * *